US005952070A

United States Patent [19]

Depiero

[11] Patent Number: 5,952,070

[45] Date of Patent: Sep. 14, 1999

[54] MOUSE PAD

[76] Inventor: Maurice Depiero, 743 Park Avenue, Beausejour, Canada, R0E 0C0

[21] Appl. No.: 08/897,027

[22] Filed: Jul. 18, 1997

Related U.S. Application Data

[60] Provisional application No. 60/038,162, Feb. 13, 1997.

[51] Int. Cl.[6] .......... A47G 23/00

[52] U.S. Cl. .......... 428/40.1; 248/205.3; 248/346.01; 248/918; 345/156; 345/163; 428/156; 428/172

[58] Field of Search .......... 428/172, 156, 428/40.1; 248/346.01, 205.3, 918; 345/163, 156; 15/71

[56] References Cited

U.S. PATENT DOCUMENTS

| | | | |
|---|---|---|---|
| 4,799,055 | 1/1989 | House | 340/710 |
| 5,073,457 | 12/1991 | Blackwell | 428/484 |
| 5,508,084 | 4/1996 | Reeves | 428/172 |
| 5,738,325 | 4/1998 | Brown | 248/346.01 |

FOREIGN PATENT DOCUMENTS

| | | |
|---|---|---|
| 0 274 875 | 7/1988 | European Pat. Off. . |
| 0 628 854 | 6/1994 | European Pat. Off. . |
| 2716736 | 1/1995 | France . |
| G 93 08 039 | 5/1993 | Germany . |
| 9-254329 | 9/1997 | Japan . |
| 95-32258 | 11/1995 | WIPO . |

OTHER PUBLICATIONS

Patent Abstract of Japan publication 09254329.

*Primary Examiner*—Nasser Ahmad
*Attorney, Agent, or Firm*—Adrian D. Battison; Murray E. Thrift

[57] ABSTRACT

A mouse pad for mounting on a desk surface comprises a very thin (of the order of 0.005 inch) sheet of translucent polycarbonate plastics material having a clear re-peelable water based adhesive layer applied directly on the desk side for attachment of the sheet to the desk surface.

1 Claim, 1 Drawing Sheet

MOUSE PAD

This application claims benefit of U.S. Provisional Application 60/038,162, Feb. 13, 1997.

This invention relates to a mouse pad and to a method using the mouse pad of providing an input into a computer.

BACKGROUND OF THE INVENTION

The mouse pad has become an essential component of any working desk utilizing a computer mouse.

Generally a mouse pad comprises a layer of a foamed rubber material on which is applied a top sheet of fabric or plastic and the fabric or plastic is often printed with a logo or other information. Such mouse pads are relatively expensive and relatively bulky and therefore are conventionally sold as a marketable consumer item carrying a significant cost.

Other types of mouse pad include a sheet of relatively stiff plastics material having a thickness of the order of 0.125 inch. This is also expensive as the sheet is relatively thick in order to avoid communicating surface imperfections or bumps in the supporting surface through to the top surface of the material on which the mouse runs.

A yet further type of mouse pad which is presently available is formed by a layer of fabric which is adhesively attached to a desk surface. This product is marketed at a relatively high price and is relatively thick so again there is some ability of the product to prevent the communication of surface irregularities to the mouse surface.

A yet further type of mouse pad which is presently available is formed of a thinner layer of plastics material which is believed to be of the order of 0.015 inch thick which is laminated to a layer of dense rubber so as to be relatively stiff.

SUMMARY OF THE INVENTION

It is one object of the present invention to provide an improved mouse pad.

According to one aspect of the invention there is provided a mouse pad comprising a sheet of plastics material having a thickness less than 0.01 inch with a layer of adhesive coated on a lower side of the sheet, the layer being covered by a peelable covering sheet, the pad having an upper surface which is arranged with surface characteristics, width and length to allow the movement of a mouse thereon which is sufficient to cause rotation of a ball of the mouse to provide input to a computer, the adhesive layer being substantially directly coated on the plastics material such that the mouse pad when applied to a horizontal surface of a desk consists of substantially solely of the adhesive layer and the sheet.

Preferably the sheet has the thickness and surface characteristics of the material manufactured by G.E. at the date of this application under the trade mark Lexan and the designation 8B35 Velvet Mat.

Preferably the plastic material has a thickness of the order of 0.005 inch.

Preferably the adhesive has a thickness lee than 0.01 inch.

Preferably the adhesive is a clear water based adhesive directly applied as a layer to the sheet.

Preferably the plastic material is of constant thickness.

Preferably the plastic material has thereon printing which is visible when viewing the plastic material from the side there opposite the adhesive.

Preferably the adhesive is of a character allowing removal and replacement of the sheet.

Preferably the plastic material is translucent and the adhesive layer is clear so that the pad is translucent allowing viewing of the supporting surface.

According to a second aspect of the invention there is provided a method of providing an input to a computer comprising:

providing a mouse committed to the computer;

providing a mouse pad comprising a sheet of plastics material having a thickness less than 0.01 inch with a layer of adhesive coated on one side of the sheet, the layer being covered by a peelable covering sheet, the pad having width and length dimensions to allow the movement of a mouse thereon which is sufficient to provide input to a computer;

peeling the peelable covering sheet to expose the adhesive;

applying the sheet of plastics material directly to a horizontal desk surface and moving the mouse on the mouse pad sufficient cause rotation of a ball of the mouse to provide an input to the computer.

wherein the adhesive layer is directly coated on the sheet such that the mouse pad when applied to a horizontal surface of a desk consists of substantially solely of the adhesive layer and the sheet.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
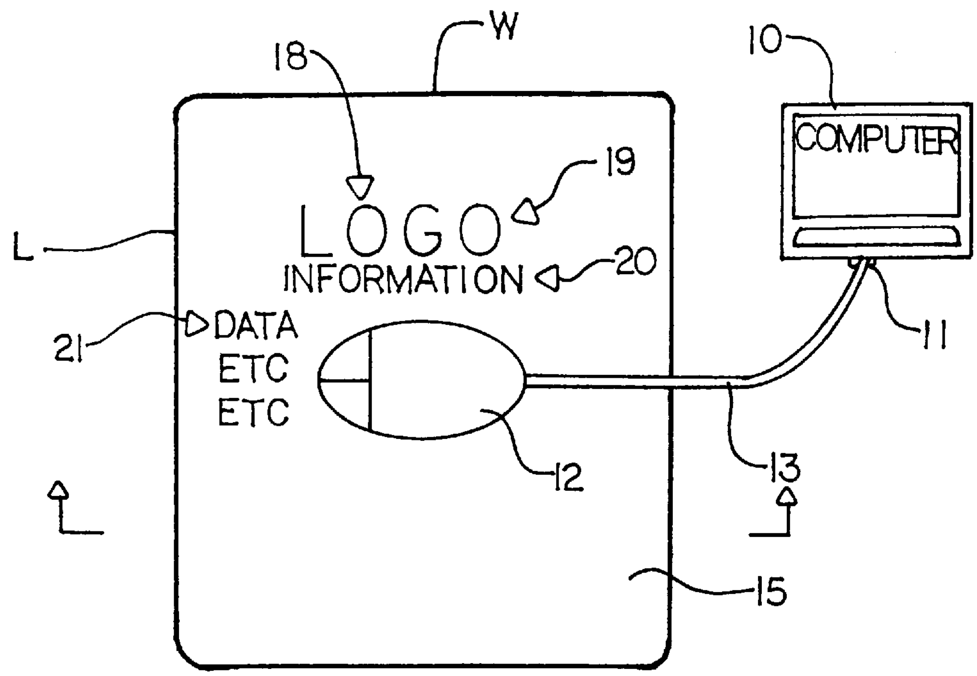
FIG. 1 is a top plan view of a mouse and mouse pad according to the present invention.

FIG. 1 is shown a conventional computer 10 which is shown schematically as its is well known to one skilled in the art. The computer has an input interface 11 which receives input data from a mouse 12 having a cable 13 again of conventional construction.

The mouse is mounted on a mouse pad 15 which is shaped with a length "L" and a width "W" which is sufficient in size to allow movement of the mouse over a sufficient distance to provide an effective input into the computer. In general a mouse pad is of the order of 8¾×9¾ inches although this dimension can of course vary in accordance with requirements.

The mouse pad comprises a smooth or textured flat layer 16 of a polycarbonate material which has a thickness less than 0.05 inch preferably less than 0.01 inch and most preferably in the order of 0.005 inch. Thus the sheet 16 is thin enough to be flexible and inexpensive. The sheet carries no resilient covering material and in itself is insufficiently stiff to be self supporting but instead requires the support of an underlying horizontal desk surface 17 to hold the sheet at a horizontal orientation.

The use of polycarbonate is preferred as a plastics material which is resistant to wear and resistant to scratching and of the damage. However other types of plastics material may also be used provided they give sufficient resistance to wear and damage to provide an upper surface which is smooth and flat.

The sheet 16 is preferably translucent so that it is visible on the desk surface since it is not transparent and thus provides an area which is visually discernible from the remainder of the desk. The sheet may however be covered with a coloured layer which can be applied underneath the sheet or on top of the sheet. The sheet is covered with printed indicia 18 which can provide indicia defining a logo 19, various information 20, data 21 or other material of value to the operator of the equipment. Underneath the sheet 16 is provided directly applied to the sheet a layer of a clear water based adhesive 21 which is of the replaceable type which allows the sheet to be removed and replaced and that indicia remains attached to the sheet without breaking away to leave patches on the support surface 17 and which retains its tackiness allowing the sheet to placed at a different location on the desk surface 17. As the sheet is translucent and the adhesive layer is clear, the whole structure is preferably translucent allowing viewing of the color and pattern on the underlying support surface. Thus for example a desk top of marble or wood grain can be viewed through the pad so as not to detract from the appearance of the attractive desk surface. The use of water based adhesive avoids the use of environmentally unsuitable solvents.

When supplied, the adhesive layer 21 is covered with a peelable covered layer 22 which is divided along a line across the pad such that flexing of the pad opens the layer away from the pad at one corner so that the layer can be peeled as indicated at 23 to expose the adhesive.

The use of the very thin plastics sheet as a mouse pad is surprising in that it is contrary to the normal practice of providing a relatively thick structure which is thus resistant to transmitting surface imperfections to the upper surface on which the mouse rolls. Up until now it has not been appreciated that the surface of this type is suitable for receiving a mouse and allowing the mouse to move smoothly while properly communicating the motion of the mouse through the mouse ball to the input transducers.

The plastics material which has been found to be particularly suitable for the present invention is that manufactured by G.E. in the United States under the trademark Lexan and under the designation 8B35 Velvet Mat. This Lexan film has a thickness of 0.005 inch and a mat upper surface so that it is translucent. The conventional usage for this material is in covering electronics key pads. This material is at present the finished material which is available from G.E. and G.E. is the only supplier of polycarbonate films of this type. The clear or gloss film available is unsuitable since it does not provide the required surface characteristics.

Figure 2:
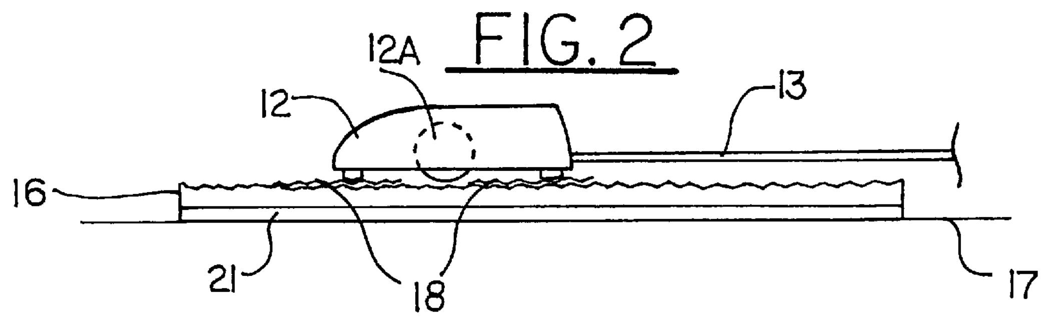
FIG. 2 is a cross section along the lines 2—2 of FIG. 1.
Figure 3:
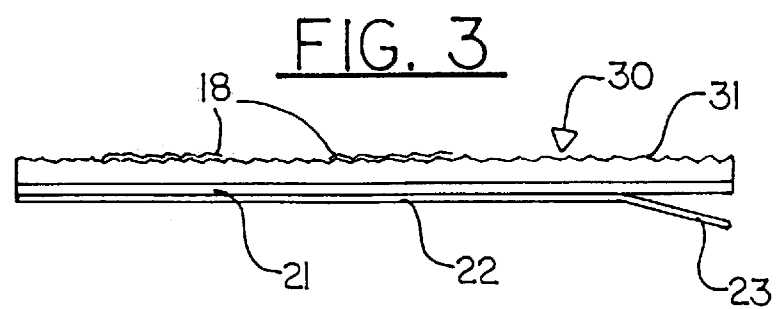
FIG. 3 is a similar cross section of that of FIG. 2 showing the mouse pad player to application to a supporting desk surface.

The film identified above has particular surface characteristics or texturing of the surface including a series of bumps, the height of which and a number of which can be determined by measurement which is particularly suitable for operation of a mouse in that it allows effective sliding action of the body of the mouse while providing sufficient friction on the ball of the mouse to roll the ball. The ball is indicated at 12A in FIG. 2. The upper surface 30 of the sheet includes the bumps or texturing indicated at 31. The printing 18 is sufficiently thin so that it does not affect the surface characteristics of the surface 31.

In comparison with conventional mouse pads which are presently available, the present device will typically have a weight of the order of 10 grams which compares to a weight of the order of 50 grams for the foam backed fabric product and a typical weight of 105 grams for the thick polycarbonate backed by the dense rubber material.

The following table provides an indication of the coefficient of static friction of each of the above mentioned types of product including the present invention.

TABLE 1

Coefficient of Static Friction Test Results

| SAMPLE DESIGNATION | | COEFFICIENT OF STATIC FRICTION |
|---|---|---|
| Cloth surface | 1 | 5.67 |
| mouse pad | 2 | 14.30 |
| with rubber back. | 3 | 11.43 |
| AVERAGE | | 10.47 |
| Hard surface | 1 | 1.04 |
| mouse pad with | 2 | 0.90 |
| rubber back. | 3 | 0.87 |
| AVERAGE | | 0.94 |
| Present Device | 1 | 0.84 |
| | 2 | 0.87 |
| | 3 | 0.84 |
| AVERAGE | | 0.85 |

The mouse pad of the present invention, it is submitted, is advantageous that it is extremely inexpensive and therefore can be supplied as a promotional item rather than a commercially saleable item. For the first time, therefore, the supplier of software or other information can afford to supply the mouse pad as a give away item solely on the basis that it acts as a promotional item for reminding the user of the name and details of the supplier. The logo of the supplier can therefore be attached as indicated at 19 and other information such as address and other details can be included together with data or information which is valuable to the consumer such as instructions for particular program or otherwise.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of providing an input to a computer comprising:

providing a mouse connected to the computer;

providing a mouse pad consisting of one sheet having a thickness less than 0.01 inch with a layer of adhesive coated on an under side of the sheet, the layer being covered by a peelable covering sheet, the pad having width and length dimensions to allow the movement of a mouse thereon which is sufficient to provide input to a computer;

peeling the peelable covering sheet to expose the adhesive;

providing the sheet with an upper surface arranged to cause rotation of a ball of the mouse;

applying the sheet on to a horizontal desk surface, locating the mouse on said mouse pad sheet and moving the mouse on the upper surface of the sheet thereby providing an input to the computer;

providing on the sheet printing which is visible when viewing the upper surface of the sheet;

wherein the adhesive layer consists solely of a single clear film of a water based adhesive material arranged so as to provide an adhesive effect allowing ready removal of the sheet and adhesive reattachment of the sheet on the surface of the desk;

and wherein the single clear film is directly coated on the sheet such that the mouse pad when applied to a horizontal surface of a desk consists solely of the single clear film and the sheet.

* * * * *